United States Patent
Shi et al.

(10) Patent No.: US 11,593,489 B2
(45) Date of Patent: Feb. 28, 2023

(54) NON-VOLATILE-MEMORY (NVM) CONTENTS READ RETURN VALIDATION

(71) Applicant: MaxLinear, Inc., Carlsbad, CA (US)

(72) Inventors: Jiaxiang Shi, Singapore (SG); Chun Feng Hu, Singapore (SG); Yao Chye Lee, Singapore (SG); Qiming Wu, Singapore (SG)

(73) Assignee: MaxLinear, Inc., Carlsbad, CA (US)

( * ) Notice: Subject to any disclaimer, the term of this patent is extended or adjusted under 35 U.S.C. 154(b) by 915 days.

(21) Appl. No.: 16/235,366

(22) Filed: Dec. 28, 2018

(65) Prior Publication Data
US 2020/0210587 A1 Jul. 2, 2020

(51) Int. Cl.
G06F 21/57 (2013.01)
G11C 29/38 (2006.01)
G06F 9/4401 (2018.01)
G06F 3/06 (2006.01)

(52) U.S. Cl.
CPC .......... *G06F 21/575* (2013.01); *G06F 3/0604* (2013.01); *G06F 3/0622* (2013.01); *G06F 3/0659* (2013.01); *G06F 9/4401* (2013.01); *G11C 29/38* (2013.01); *G06F 2221/034* (2013.01)

(58) Field of Classification Search
CPC .... G06F 21/575; G06F 3/0604; G06F 3/0622; G06F 3/0659; G06F 9/4401; G06F 2221/034; G06F 21/57; G11C 29/38
See application file for complete search history.

(56) References Cited

U.S. PATENT DOCUMENTS

| | | | | |
|---|---|---|---|---|
| 2003/0084285 A1* | 5/2003 | Cromer | .................. | G06F 21/554 713/164 |
| 2010/0106929 A1* | 4/2010 | Krig | ....................... | G06F 21/57 711/163 |
| 2012/0151199 A1* | 6/2012 | Shriver | ................. | G06F 21/575 713/193 |
| 2015/0200934 A1* | 7/2015 | Naguib | ................. | G06F 21/575 713/168 |
| 2015/0261975 A1* | 9/2015 | Brumley | ............... | H04L 9/0894 713/193 |
| 2017/0303187 A1* | 10/2017 | Crouthamel | ...... | H04W 52/0235 |
| 2018/0189496 A1* | 7/2018 | Wu | ........................ | G06F 21/575 |
| 2019/0042765 A1* | 2/2019 | Chung | .................. | G06F 21/602 |

* cited by examiner

*Primary Examiner* — Jung W Kim
*Assistant Examiner* — Howard H. Louie
(74) *Attorney, Agent, or Firm* — Buchalter; Jason W. Croft (57) ABSTRACT

A boot read only memory (ROM) chip unit can perform a secure boot routine based on various operations. A processor device comprises a boot ROM chip with processing circuitry on a system board configured to perform a system board power up according to a read operation in a one-time-programmable OTP memory/non-volatile memory (NVM). The OTP memory/NVM includes a spare area in a portion of the OTP/NVM that can receive a first sequence pattern. The processor determines whether a secure boot indication indicates a secure boot routine, and differentiates one or more read return content of the OTP memory/NVM between a wrongly read return content and a trusted read return content, in response to, or concurrent with, the secure boot indication indicating the secure boot routine.

7 Claims, 5 Drawing Sheets

NON-VOLATILE-MEMORY (NVM) CONTENTS READ RETURN VALIDATION

FIELD

The present disclosure is in the field of memory, and more specifically, pertains to validation of non-volatile-memory (NVM) contents read return.

BACKGROUND

Some one-time-programmable (OTP) memory values could be used by software as a flag to perform certain functions. For example, setting a specific bit in OTP enables bootrom (or Boot ROM) to perform a secure boot operation. During the system board power up sequence test, an unexpected power-up sequence can cause the OTP read to return all zeros, even though the secure boot indication bit was already set. Because the bootrom code cannot necessarily differentiate whether this zero is a true zero (real zero in OTP) or a false returned zero, it can enable boot up with an unsecure image, which can effectively cause an unsecure image booting up on a secure boot chip. Hackers can exploit this vulnerability to bypass the secure boot flow, hence achieving a "privilege abuse" attack. The root cause of this problem is the weakness of the OTP surrounding circuit or associated processor unit component.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Overview

In consideration of the above described deficiencies of non-volatile memory (NVM) contents provide an additional indication for OTP validity at the system level. Using this method, the risk of wrong OTP reading value due to the attack on the surrounding circuit is greatly reduced. As state above, during the system board power up sequence test as in a processor or computer device booting, an unexpected power-up sequence can cause the OTP read to return all zeros, even though the secure boot indication bit was already set. Without additional indication from a setting of a specific bit in the one-time-programmable (OTP) memory (e.g., an NVM), it could be difficult for the computing device or system on a chip (SOC) to determine an wrongly read/"fake zero" from the real OTP value/"true zero".

In various aspects/embodiments, the NVM/OTP memory of an SOC processor system or component can include a spare area for production testing or product integrity tests. For example, a production tester can write and read into this area to ensure the NVM/OTP can be accessed correctly with security and integrity of the processor and corresponding interface(s). When a production test of NVM/OTP is passed, the processor with the testing program can write a specific bit pattern such as a proprietary bit pattern (P Pattern) to the spare area.

For an OTP without a spare area or where the spare area cannot be accessed by the system, the testing program could write into the function area instead. In NVM/OTP local read finite state machine (FSM) hardware (HW), this specific bit pattern can be read out by HW and sent to a HW logic component to be compared with another pre-defined value or a local pattern (L Pattern). If the two patterns or values substantially match or identical, a specific bit or set of bits (OTP_READ_OK) in one register can be set to indicate that the OTP value should be able to read out correctly. A match, for example, can occur if the OTP contents access is fully transferable or secure.

On the other hand, if the surrounding circuit or processing unit is under malicious attack and the OTP value cannot be retrieved correctly (e.g., reading all zeros), the OTP_READ_OK bit(s) will not be set or provide indication for secure boot up. Because a specific pattern (e.g., a bit pattern or sequence) is used for testing processes instead of a one bit in the spare area, the possibility of a wrong OTP value while the OTP_READ_OK is set is very low. In other words, the return value of OTP is considered reliable only if this bit or plurality of bits is set to indicate a system integrity that is trustable. Additional aspects, embodiments or details of the disclosure are further described below with reference to figures.

Figure 1:
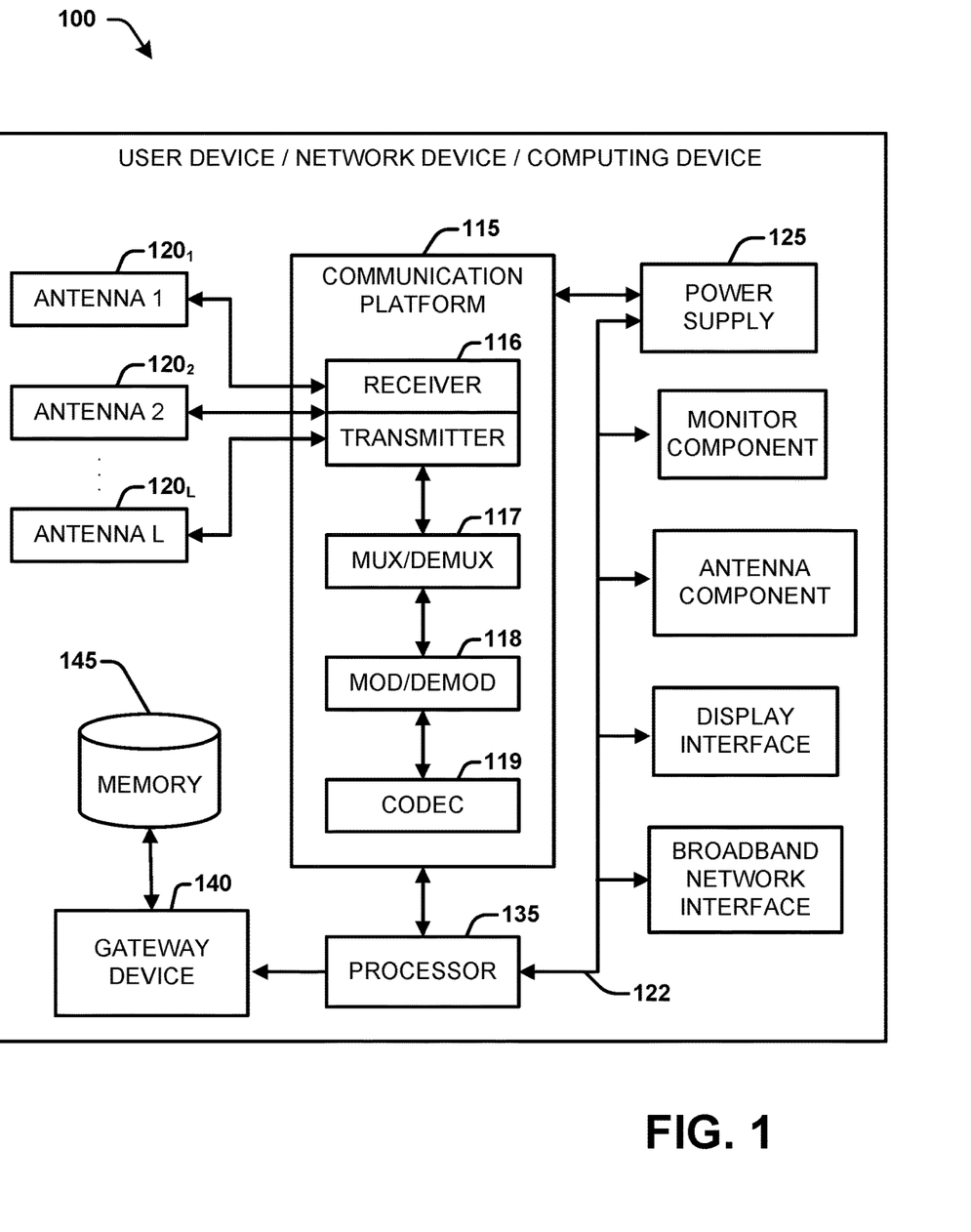
FIG. 1 is a block diagram illustrating an example user device/network system or computing device according to various aspects described.

In order to provide further context for various aspects of the disclosed subject matter, FIG. 1 illustrates a non-limiting example of a computing device or system 100, such as a laptop, tablet, user equipment (e.g., mobile phone), user device, gateway network device (e.g., a server, server rack, a network switch component, a customer premise equipment, a personal computer, or other device communicatively coupled to a home network with gateway device 140) or other communication device or wireless terminal 100 that can implement some or all of the aspects described herein. In an aspect, a wireless terminal, such as a laptop, tablet, other communication device, or system 100 can receive and transmit signal(s) to and/or from wireless devices such as APs, access terminals, wireless ports and routers, or the like, through a set of L antennas 120, which can be configured according to one or more embodiments or aspects described herein. In one example, antennas 120 can be implemented as part of a communication platform 115, which in turn can comprise electronic components and associated circuitry and/or other means that provide for processing and manipulation of received signal(s) and signal(s) to be transmitted. The antennas 120 can comprise the various antenna elements incorporating the different aspects or embodiments disclosed herein. In one example, the antennas 120 can be located along an edge or side 120 of the wireless terminal 100, which can be within a same quadrant, section, portion or subset of the volume of the mobile device, opposing or different sections, for example.

In an aspect, communication platform 115 can include a monitor component 104 as well as an antenna component 106, which can couple to communication platform 115 and include electronic components with associated circuitry that provide for processing and manipulation of received signal(s) and other signal(s) to be transmitted. The communication platform 115 can further comprise a receiver/transmitter or transceiver 116, which can transmit and receive signals or perform one or more processing operations on such signals (e.g., conversion from analog to digital upon reception, conversion from digital to analog upon transmission, etc.). In addition, transceiver 116 can divide a single data stream into multiple, parallel data streams, or perform the reciprocal operation.

Additionally, the communication device 100 can include display interface 108, which can display functions that control functionality of the device 100, or reveal operation conditions thereof. In addition, display interface 108 can include a screen to convey information to an end user. In an aspect, display interface 108 can be a liquid crystal display, a plasma panel, a monolithic thin-film based electro chromic display, and so on. Moreover, display interface 108 can include an audio component (e.g., speaker) that facilitates communication of aural indicia, which can also be employed in connection with messages that convey operational instructions to an end user. Display interface 108 can also facilitate data entry (e.g., through a linked keypad or through touch gestures), which can cause access equipment and/or software 100 to receive external commands (e.g., restart operation).

Broadband network interface 120 facilitates connection of access equipment and/or software 100 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 110 can be internal or external to access equipment and/or software 100, and can utilize display interface 108 for end-user interaction and status information delivery.

Processor 135 can be functionally connected to communication platform 108 and can facilitate operations on data (e.g., symbols, bits, or chips) for multiplexing/de-multiplexing, such as effecting direct and inverse fast Fourier transforms, selection of modulation rates, selection of data packet formats, inter-packet times, and so on. Moreover, processor 135 can be functionally connected, through data, system, or an address bus 122, to display interface 108 and broadband network interface 110, to confer, at least in part, functionality to each of such components such as in booting the device 100 or powering up itself as a system on a chip (SOC), for example.

In another example, a multiplexer/de-multiplexer (mux/demux) unit 117 can be coupled to transceiver 116. Mux/demux unit 117 can, for example, facilitate manipulation of signal in time and frequency space. Additionally or alternatively, mux/demux unit 117 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 117 can scramble and spread information according to substantially any code generally known in the art, such as Hadamard-Walsh codes, Baker codes, Kasami codes, polyphase codes, and so on.

In a further example, a modulator/demodulator (mod/demod) unit 118 implemented within communication platform 115 can modulate information according to multiple modulation techniques, such as frequency modulation, amplitude modulation (e.g., L-ary quadrature amplitude modulation (L-QAM), etc.), phase-shift keying (PSK), and the like. Further, communication platform 115 can also include a coder/decoder (codec) module 119 that facilitates decoding received signal(s) and/or coding signal(s) to convey.

According to another aspect, wireless terminal 100 can include a processor 135 configured to confer functionality, at least in part, to substantially any electronic component utilized by wireless terminal 100. As further shown in system 100, a power supply 125 can attach to a power grid and include one or more transformers to achieve a power level at which various components and/or circuitry associated with wireless terminal 100 can operate. In one example, power supply 125 can include a rechargeable power mechanism to facilitate continued operation of wireless terminal 100 in the event that wireless terminal 100 is disconnected from the power grid, the power grid is not operating, or the like. The antennas, for example, with the other antenna element configurations can further facilitate communications with a wireless charging of the power supply 125, such as with a transfer of energy from the antenna system to the power supply 125 via an oscillating magnetic field, for example.

In a further aspect, processor 135 can be functionally connected to communication platform 115 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 135 can be functionally connected, via a data or system bus 122 (e.g., a wireless PCIE or the like), to any other components or circuitry not shown in system 100 to at least partially confer functionality to each of such components, such as by the antenna systems disclosed herein.

As additionally illustrated, a memory 145 can be used by wireless terminal 100 to store data structures, code instructions and program modules, system or device information, code sequences for scrambling, spreading and pilot transmission, location intelligence storage, determined delay offset(s), over-the-air propagation models, and so on. Processor 135 can be coupled to the memory 145 in order to store and retrieve information necessary to operate and/or confer functionality to communication platform 115 and/or any other components of wireless terminal 100 via an interface 122.

Figure 2:
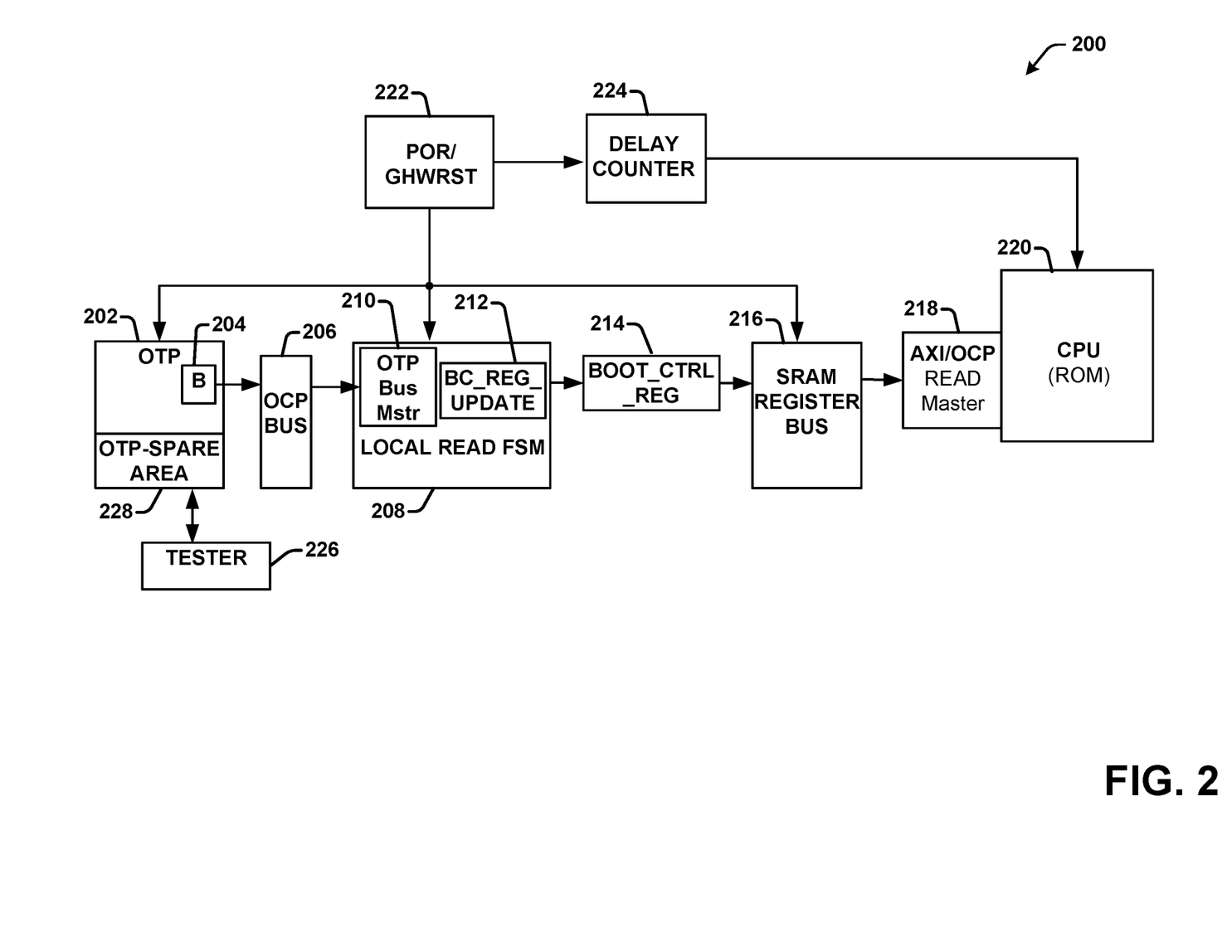
FIG. 2 is a block diagram illustrating a processing device or system such as a system on a chip (SOC) according to various aspects described.

Referring to FIG. 2, illustrated is an example processor component system for NVM read return validation operations in a boot up routine in accordance with various aspects being described herein. The device or system 200 can be a system on a chip (SOC) that comprises a processor or computer processing unit (CPU) 220 (e.g., processor 135) coupled to, or integrated with, an interface read master 218 (e.g., an advanced extensible interface (AXI), open core protocol (OCP) or the like), an SRAM register bus 216, a boot (bootrom code) control register 214, a local read finite state machine (FSM) 208, an OCP bus 206, and an OTP memory/NVM 202. The system 200 further includes a POR/GHWRST 222 and a delay counter 224 coupled to various components for timing and hardware reset operations such as for a boot up routine or powering up.

The processor or computer processing unit (CPU) 220 (e.g., the processor component 135) includes a read only memory (ROM) and can be utilized for a secure boot up or powering of a system 200 or device 100 to enable a secure boot up operation. The CPU 220 is configured to ensure and enable a secure boot operation, and also, as further described in more detail in FIG. 3, differentiate one or more read return contents of an OTP memory/NVM read operation from the OTP memory/NVM 202 between a correctly read return content and false read return content.

The POR/GHWRST component 222 can operate to reset the SOC 200 configured to operate a power on reset operation and a global hardware reset operation. Specifically, one or more phase locked loops (PLLs) (not shown) of the SOC 200 can be reset by the POR of the component 222, rather than the GHWRST of the component 222; both, can reset the SOC 200 for initiating operations, especially boot-up operation or power-on routines for the aspects/embodiments described herein. Because the SOC 200 is being reset by the component 222, it returns to a status quo operation mode after a period of time that is in response to and managed by the delay counter 224. The delay counter 224 counts on each oscillator (XO) clock cycle and provides a reset release time as a reset release time, for example. The POR/GHWRST component 222 can be coupled to the OTP memory/NVM 202, the local read finite state (FSM) 208 and the boot register bus 216, as well as to the CPU ROM component 220 via the delay counter signal of a delay counter 224. As such, the POR/GHWRST component 222 can reset these components as hardware logic components for a boot up operation to initiate boot up and read return operations.

The OTP memory/NVM 202 can be coupled to, embedded in, or integrated in the silicon of the processor unit 220. The OTP memory/NVM 202 can be configured to store one or more secure assets (e.g., root-of-trust security asset(s)) as well as one or more key decision flags, for example. The OTP memory/NVM 202 can include a spare area (OTP-spare area) 228 and a secure boot indication 204. The OTP-spare area 228 and a secure boot indication 204 can be independent of one another at separate locations on the OTP memory/NVM 202 for different functions.

The OTP-spare area 228 can be configured for production (product) testing of the OTP memory/NVM 204 to ensure its integrity or proper operation for read out operations (communications) during a power-up or boot-up of a system or device 100 or 200, or an associated component (e.g., the interface 122, input connections/terminals, output connections/terminals, or the like). The OTP-spare area 228 can be coupled to or connected to a tester 226 that can read from or write to the spare area 228.

In an aspect, the OTP memory/NVM 202 can also comprise a secure boot indication 204 (e.g., a boot up flag, or the like). This indication 204 can be a bit, for example, as a decision flag, which can indicate whether there is a problem with the OTP memory/NVM 202 or a read operation associated with it. The indication 204 can be used by bootrom code as a check to ensure a secure read operation or determine whether there is a problem with the hardware or the bootrom code in a read operation being performed.

The OCP bus 206, for example, can operate as, or comprise, an open core protocol (OCP) bus for on-chip subsystem communication(s), which can be core-centric protocols defining an independent bus as a configurable interface. The OCP bus 206 can be configured to receive the secure boot indication 204 and provide this to the OTP bus master 210 that can initiate a read from the secure boot indication to obtain the secure boot indication bit (B) after or concurrent with a hardware reset initiated with the POR/GHWRST component 222 and a delay counter signal of a delay counter 224.

The local read finite state machine (FSM) 208 can then write the secure boot indication bit into a boot control register 214 from a boot control register update 212 located at, or as a part of, the local read FSM 208. The boot control register 214 can be connected between the local FSM 208 and a static random-access memory (SRAM) register bus 216 along a path/processing pathway for processing the secure boot indication. The SRAM register bus can obtain the write (write contents) (e.g., the bit value) in the boot control register 214 and pass it along to the CPU ROM component 220 via the advanced extensible interface (AXI)/open core protocol (OCP) read master 218. The ROM chip 220 can then process the boot control register 214 to determine whether a secure boot routine/operation or a non-secure routine is to be performed.

In an example, if the ROM chip 220 reads that the boot control register 216 is a one, it can further enable a secure boot up routine based on the read out (read return result) from the OTP memory/NVM 202. However, if the read out is a zero, a routine other than the secure boot up routine can be performed such as to a default routine or image.

In an embodiment further detailed infra (e.g., at FIG. 3), the spare area 228 can receive a proprietary sequence pattern for storage of the spare area outside of, next to, or within the OTP memory/NVM 202 separate from the OTP memory/NVM as part of connected or integrated processing circuitry of the OTP memory/NVM 202. Additionally, as stated above the OTP-Spare area 228 can also be configured as part of product testing to ensure integrity of the OTP memory/NVM 202 or an associated read operation of the OTP memory/NVM 202. After a successful test, the OTP memory/NVM 202 can receive the sequence pattern comprising a plurality of one or more: letters, numbers, symbols, alphanumeric characters, image or the like, as written into it by the tester 226, for example.

Figure 3:
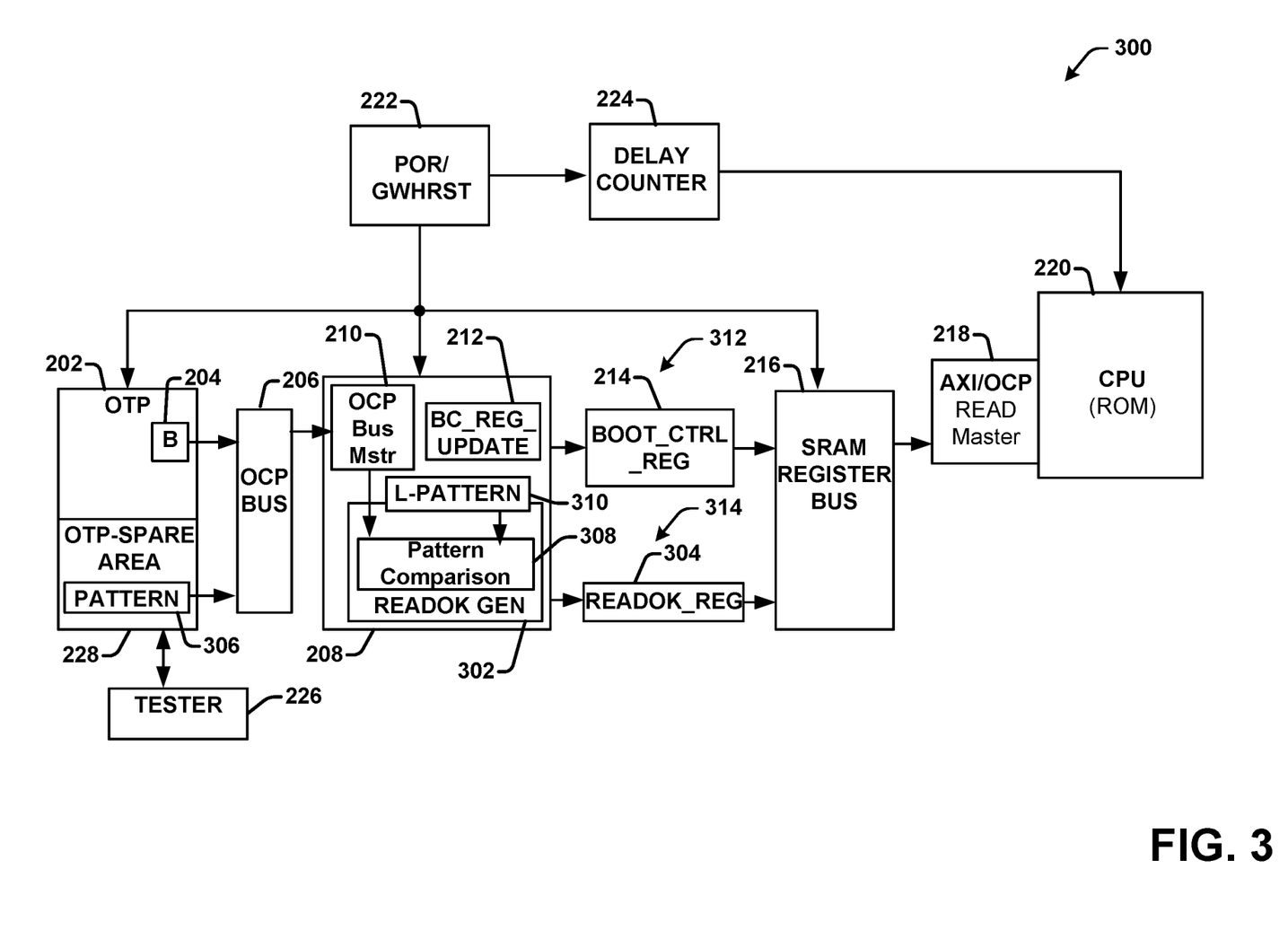
FIG. 3 is another block diagram illustrating the processing device or system according to various aspects described.

Referring now to FIG. 3, illustrated is another example of a processor component system 300 for performing read return operations in a boot up process routine in accordance with various aspects described herein. The device or system 300 comprises similar components as the device/system 200 of FIG. 2, and further comprises a local hardware component 302 and a separate read-ok register 304.

The OTP-spare area 208 further comprises a proprietary pattern (P-pattern, or pattern) 306 that can be written to a location by the tester 226 in response to product test of the OTP memory/NVM 202 or other component. If the test is successful, where the interface connected thereto, functionality or integrity of the OTP memory/NVM 202 passes (e.g., indicated as trustable or functional by a key performance indicator or satisfaction of a threshold), then the OTP memory/NVM 202 can be read therefrom. Because the OTP memory or NVM 202 is a one-time program it cannot necessarily be written and read from like a regular memory; as such a read and write test can destroy the OTP. Thus, the OTP-spare area can operate as a partition of the OTP that allows a product test, apart from the remaining OTP memory space of the OTP memory 202. If a read and write can be done at the OTP spare-area, then the OTP memory/NVM 202 can be considered correctly accessible.

In one example, the pattern 306 can be written to a particular portion only, such as at a same portion, in the OTP-Spare area 208. The pattern 306 can be a sequence pattern that comprises one or more indications of: letter(s), number(s), alpha-numeric symbol(s), bit(s), symbol(s), or the like. The pattern can be a sequence pattern that can be a proprietary sequence of a plurality of indications of a value or an image, for example. The sequence pattern 306 as well as the L sequence pattern 310 can be generated from a true random number generator, for example.

The local read FSM 208 can further comprise the READ-OK generator (GEN) as a hardware logic component 302 that operates to generate a comparison of the first pattern received from the pattern 306 of the OTP-spare area 208 in the OTP memory/NVM 202 with the locally hardcoded sequence pattern 310. If the two patterns 306 and 310, or values thereof, substantially match or are identical, a specific bit or set of bits (OTP_READ_OK) in one register can be set to indicate that the OTP value should be able to read out correctly. A match, for example, can occur if the OTP contents access is fully transferable or secure. The sequence pattern 306 is within, a part of, or comprised by the OTP memory 202, and the L sequence pattern is hard coded in the architecture design, so the two sequence patterns could match, if the OTP contents access is fully transferable or secure.

The hardware logic component 302 can obtain the pattern 306 via the OCP bus master 210. The OCP bus master 210 can receive the pattern 306 from the OCP bus 203, which can also be a separate connection to the pattern 306 location in the OTP-spare area 208 than the secure boot indication 204 or a separate input terminal to the OTP memory/NVM 202; alternatively, the OCP bus can address these at different addresses over a same connection input.

The OCP bus master 210 can also operate to obtain or receive the secure boot indication 204 as described above with respect to FIG. 2, which it then passes along to update a boot control register update in the local read FSM 208, which can then be passed along to the boot control register located in the first path 312 between the local read FSM component 208 and the SRAM register bus 216.

In one aspect, the OCP bus master 210 can obtain the secure boot indication 204 based on, or after, a comparison 308 is generated by the READ OK generator 302. For example, if the comparison 308 between the patterns is successful, then the CPU ROM 220 chip or the local read FSM 208 can initiate a retrieval and analysis of the secure boot indication 204. Alternatively, such operations, including evaluation of the secure boot indication 204 and the sequence pattern 306, can be performed concurrently or together.

In another aspect, the hardware logic component 302 (READOK_GEN) further comprises a connection to or access to a hardware coded local pattern (L-PATTERN) as a second sequence pattern 310. This second sequence pattern 310 can be another predefined value or sequence of characters including, but not limited to, one or more of: letter(s), number(s), alpha-numeric symbol(s), bit(s), symbol(s), or the like. In response to receiving the pattern 306 via the OCP bus master 210, the hardware logic component 302 is configured to generate a comparison of the first sequence pattern 306 with the second sequence pattern 310. Based on the result of the comparison, the hardware logic component 302 performs a write into the READ OK register 304.

In an aspect, the processor component system 300 (e.g., SOC) can be configured so that if there is a zero in the read out of the secure boot indication 204, then whether it is true or not can be identified; if not, and there is a problem with boot up this can be identified and boot operations are not enabled further. However, it cannot be easily determined alone whether one or more zeros was intended as programmed or un-programmed (or wrongly read in zero value or a trusted read value at the location as all zero(s)), which operations associated with the hardware logic component 302 and read-ok register 304 in conjunction with the secure boot indication 204 can remedy. As such, if one or the other, or both operations fail or indication an insecurity in the system or interface, then the CPU ROM chip 220 boots with a different routine than it would otherwise, if a true or pass indication was determined from both. In this manner, the SOC 300 can ascertain whether a zero from the OTP memory/NVM 202 or in the secure boot indication is intended as programmed for a secure boot routine, or is a potential threat as not initially programmed thereat, thereby halting the boot up routine. Programmed or not programmed can also refer specifically to being a trusted value of the OTP versus a wrongly read value, respectively; programmed meaning a trusted read value, and un/not programmed being a wrongly read or insecure read (unintended for secure boot up). For example, programming OTP can be done to change the silicon from unsecure boot mode to secure boot mode. By default, the silicon can be in "unsecure" mode if the OTP is not programmed. Here, a false read or zero can include programmed/not programmed reads.

In an aspect, the READ OK register 304 can be downstream of the hardware logic component 302 coupled in a second path 314 that can be different from, or independent of, the first path 312. The CPU ROM chip 220 is configured to read the READ OK register 304, determine whether the pattern comparison 308 result is successful or not. If successful, for example, then the chip 220 can continue operations of the boot routine such as by reading from the boot control register 214 to evaluate the secure boot indication 204 as valid, trustable, secure, or intentionally programmed/not programmed if it is the result of a zero. For example, a read of a one of the register (e.g., 304) can indicate that the read back is trustable, and the boot process continues based on an indication read from the boot (bootrom) control register (BOOT_CTRL_REG) 214. Otherwise, the read back from the OTP memory/NVM 202 is not reliable, and the CPU ROM 220 can reboot the system (e.g., SOC 300).

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
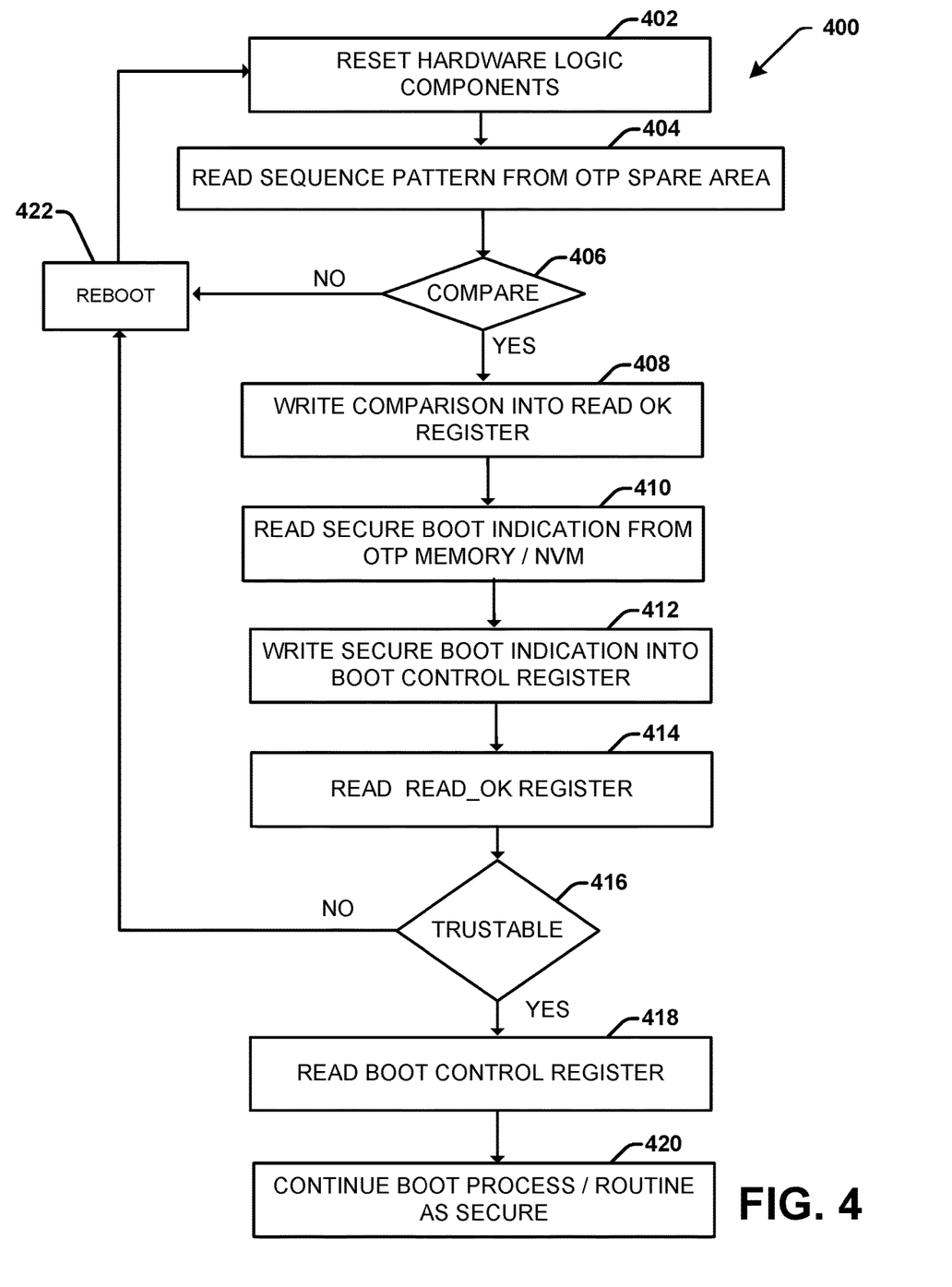
FIG. 4 is a block diagram of a process flow for processing device or system according to various aspects described.

Referring to FIG. 4, illustrated is an example process flow for ensuring a secure boot process of an SOC processing device or system in accord with various aspects (or embodiments) being described herein. All or a part of the acts or operations of the process flow 400 can be initiated in response to a boot up process being initiated or a system board power up sequence test.

The process flow 400 can initiate at 402 with resetting the hardware logic components such as a CPU ROM or boot ROM chip 220, the local read FSM 208, or the OTP memory/NVM 202.

At 404, the process flow comprises reading a sequence pattern (e.g., a proprietary (P) pattern 306) from the OTP-spare area 228 of the OTP memory/NVM 202. The P pattern 306 can be a sequence pre-programmed into the OTP-spare area, or written into the spare area in response to a successful product test.

At 406, the process flow 400 continues with comparing (e.g., via the READOK generator or a hardware logic component 302) the sequence pattern (first sequence pattern) of a number of bits, other symbols, or values, with another (second) sequence pattern that can be hard coded into the hardware memory of the local read FSM 208 coupled to the OTP memory/NVM 202 via an OCP bus 206 as a local L sequence pattern 310. If the two patterns 306 and 310 substantially match or are identical at the decision 406, then the process flow continues at 408. If not, then the process flow continues to a reboot 422 or a default image, where the process can begin again with another boot up at 402.

At 408, the process flow 400 comprises writing the comparison (or comparison result) into a read OK register 304 in response to the comparison at 406 being a match, thereby that the OTP interface is transferrable and trusted as secure.

At 410, the process flow 400 comprises reading the secure boot indication (e.g., B bit) 204 directly from the B flag of the OTP.

At 412, the process flow 400 comprises writing the secure boot indication 204 into a boot control register update 212 of the local read FSM 208 from where it can be provided into a boot control register 214.

At 414, the boot Rom or CPU ROM 220 can read the read OK register (e.g., READ OK_Reg 304).

At 416, if the read OK register 304 indicates a passing indication (e.g., a bit value or the like), READ OK register 304 should indicate if the OTP content is trustable. However, a secure boot can be indicated in the boot_ctrl_register 214 alone. If trustable, then the CPU ROM 220 can read the boot control register (e.g., Boot_CTRL_REG 214) at 418.

If at 416, the Read OK register 304 indicates that the OTP can be "trusted", the boot process can continue at 418. As such, a programmed read out of all zeros from the OTP can be determined to be secure and intended, or un-programmed and unsecure. Otherwise, the read back (read operation) from the OTP 202 is not necessarily reliable, and a reboot of the system can be performed.

At 418, since the Read OK register is true (e.g., 1), which means that the OTP read back is trustable, the boot up process can continue based on the Boot_CTRL_REG 214 value. The boot control register 214 is read out. Based on the reflected value of the secure boot flag 204 in this register 214, a reliable secure boot decision can be made. The CPU ROM will continue its boot process (secure/non-secure) based on the secure boot flag 204. The boot up continues at 420, or else reboots based on the flag 204.

Figure 5:
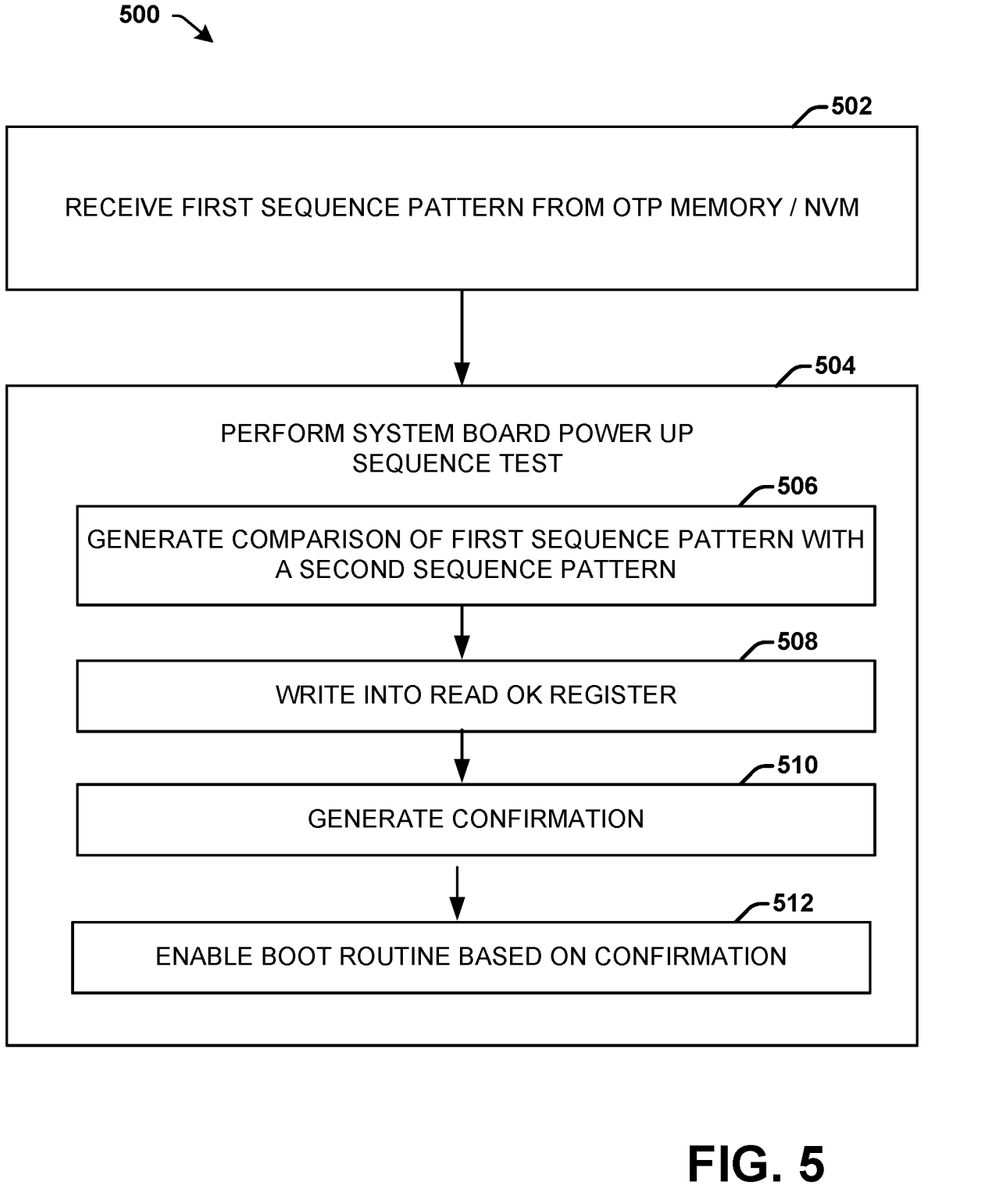
FIG. 5 is another block diagram of a process flow for processing device or system according to various aspects described.

Referring to FIG. 5, illustrated is another example process flow 500 for ensuring a secure boot process of an SOC processing device or system in accord with various aspects (or embodiments) being described herein.

The process flow 500 initiates at 502 with receiving a first sequence pattern at an OTP-spare area 228. For example, a product testing device can write the first sequence pattern into the spare area of the OTP/NVM in response to a successful product test of the OTP memory/NVM by a product tester component.

At 504, a system board power up or boot routine can be performed as a system board (or SOC) power up sequence (or sequence test).

At 506, the boot routine or system board power up sequence can continue by generating a comparison via a processor device or boot ROM chip, the first sequence pattern of the OTP memory/NVM with a second sequence pattern hard coded into a hardware logic component of the processor device or SOC.

At 508, the process flow 500 comprises performing, via the processor device, a write into a read-ok register based on the comparison.

At 510, the process flow 500 comprises generating a confirmation of whether a read return (e.g., from the OTP memory/NVM) is correctly functioning based on the write in the read-ok register and a secure boot indication.

At 512, the process flow 500 comprises enabling the boot routine based on the comparison including the write in the read-ok register and the secure boot indication. The comparison between the first sequence pattern of indications with a second sequence pattern can determine whether a read return content of an OTP memory/NVM read operation from the OTP memory/NVM comprises a programmed read return content to enable a secure boot routine from the OTP memory/NVM.

In an aspect, the SOC process flow 500 can, in response to the system board power up sequence test, determine whether an OTP memory/NVM read operation from the OTP memory/NVM comprises a set of falsely coded zeros or a set of programmed zeros based on the confirmation (e.g., the comparison result). This can include whether an OTP memory/NVM read operation from the OTP memory/NVM comprises a set of falsely coded zeros or a set of programmed zeros based on the confirmation.

In other aspects, the process flow 500 can include determining whether the secure boot indication indicates a secure boot routine, and differentiating one or more read return contents of an OTP memory/NVM read operation from the OTP memory/NVM between a programmed read return content and an un-programmed read return content, in response to, or concurrent with, the secure boot indication indicating the secure boot routine.

In one example, at least one of the first sequence pattern or the second sequence pattern can be generated via a random number generator component of the local read FSM 208, the product tester 226, the boot ROM chip 220, or other component of the system 300, for example.

In another example, the comparison can include determining whether the first sequence pattern of the OTP memory/NVM is identical to the second sequence pattern based on a plurality of bits of at least a part of the first sequence pattern and the second sequence pattern.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

A first example can be a method of a boot read only memory (ROM) chip unit to perform a boot routine comprising: receiving a first sequence pattern into a one-time-programmable OTP memory/non-volatile memory (NVM) communicatively coupled to the boot ROM chip; in response to a system board power up sequence test: generating a comparison, via a processor device, comprising the first sequence pattern of the OTP memory/NVM with a second sequence pattern hard coded into a hardware logic component of the processor device; based on the comparison, performing, via the processor device, a write into a read-ok register; generating a confirmation of whether a read return is correctly functioning based on the write in the read-ok register and a secure boot indication; and enabling the boot routine based on the confirmation.

A second example includes the subject matter of the first example, further comprising: writing the first sequence pattern into a spare area of the OTP/NVM in response to a successful product test of the OTP memory/NVM by a product tester component.

A third example includes the subject matter of any one or more of the first example to the second example, further comprising: in response to the system board power up sequence test: determining whether the secure boot indication indicates a secure boot routine; and differentiating one or more read return contents of an OTP memory/NVM read operation from the OTP memory/NVM between a programmed read return content and an un-programmed read return content, in response to, or concurrent with, the secure boot indication indicating the secure boot routine.

A fourth example includes the subject matter of any one or more of the first example to the third example, further comprising: in response to the system board power up sequence test: retrieving the secure boot indication from the OTP memory/NVM via an OTP bus master.

A fifth example includes the subject matter of any one or more of the first example to the fourth example, further comprising: in response to the system board power up sequence test: writing the secure boot indication into an SRAM register bus that is coupled to the boot ROM chip.

A sixth example includes the subject matter of any one or more of the first example to the fifth example, further comprising: generating at least one of the first sequence pattern or the second sequence pattern via a random number generator.

A seventh example includes the subject matter of any one or more of the first example to the eighth example, further comprising: determining whether the first sequence pattern of the OTP memory/NVM is identical to the second sequence pattern based on a plurality of bits of at least a part of the first sequence pattern and the second sequence pattern.

An eighth example includes the subject matter of any one or more of the first example to the third example, further comprising: in response to the system board power up sequence test: determining whether an OTP memory/NVM read operation from the OTP memory/NVM comprises a set of falsely read zeros or a set of programmed zeros based on the confirmation.

A ninth example can be a system of a boot read only memory (ROM) chip unit to perform a boot routine comprising: a processor device comprising the boot ROM chip unit including processing circuitry on a system board configured to perform a system board power up; and a one-time-programmable OTP memory/non-volatile memory (NVM), coupled to the processor device, comprising a spare area in a portion of the OTP/NVM, wherein the OTP memory/NVM is configured to receive a first sequence pattern; wherein the processor device is further configured to determine whether a secure boot indication indicates a secure boot routine, and differentiate one or more read return contents of an OTP memory/NVM read operation from the OTP memory/NVM between a wrongly read return content and a trusted read return content, in response to, or concurrent with, the secure boot indication indicating the secure boot routine.

A tenth example includes the subject matter of the ninth example, wherein the OTP memory/NVM is configured to receive the first sequence pattern at the spare area of the portion of the OTP/NVM via a product tester component in response to a successful product test.

An eleventh example includes the subject matter of any one or more of the ninth example to the tenth example, wherein the processor device comprising a hardware logic component configured to generate a comparison of the first sequence pattern in the spare area with a second sequence pattern at the hardware logic component, and perform a write into a read-ok register based on the comparison.

A twelfth example includes the subject matter of any one or more of the ninth example to the eleventh example, wherein the processor device is further configured to generate a confirmation of whether a read return is correctly functioning based on a write in a read-ok register and the secure boot indication and to enable the secure boot routine based on the confirmation.

A thirteenth example includes the subject matter of any one or more of the ninth example to the twelfth example, further comprising: a read-ok register, coupled along a first path between a hardware logic component and a standard random-access memory (SRAM) register bus, configured to receive a write based on a comparison of the first sequence pattern in the spare area with a second sequence pattern in the hardware logic component.

A fourteenth example includes the subject matter of any one or more of the ninth example to the thirteenth example, further comprising: a boot control register, coupled along a second path that is different from the first path between the hardware logic component and the SRAM register bus, configured to receive the secure boot indication.

A fifteenth example includes the subject matter of any one or more of the ninth example to the fourteenth example, further comprising: a local read finite state machine (FSM), coupled to the OTP memory/NVM and an SRAM register bus that is coupled to the boot ROM chip unit at a read master component, comprising a hardware logic component configured to generate the comparison, and configured to read the secure boot indication and update a boot control register with the secure boot indication.

A sixteenth example includes the subject matter of any one or more of the ninth example to the fifteenth example, wherein the processor device is further configured to determine whether the first sequence pattern matches the second sequence pattern, re-boot the boot ROM chip unit in response to the first sequence pattern not matching the second sequence pattern, and enable OTP related operations, including the secure boot routine, based on the secure boot indication, in response to a match of the first sequence pattern in the spare area of the portion of the OTP memory/NVM to the second sequence pattern, wherein the second sequence pattern is located in a hardware logic component of the local read FSM coupled to an input terminal of the OTP memory/NVM.

A seventeenth is an apparatus employed in a boot read only memory (ROM) chip unit to perform a boot routine comprising: a boot ROM processor including processing circuitry on a system board configured to perform a system board power up; a one-time-programmable OTP memory/non-volatile memory (NVM), coupled to the boot ROM processor, comprising a spare area in a portion of the OTP/NVM and secure boot indication in another portion of the OTP/NVM, wherein the spare area comprises a first sequence pattern of indications in response to the boot routine; a local read finite state machine (FSM), coupled to the OTP memory/NVM and an SRAM register bus that is coupled to the boot ROM chip unit, comprising a hardware logic component configured to generate a comparison of the first sequence pattern of indications with a second sequence pattern to determine whether a read return content of an OTP memory/NVM read operation from the OTP memory/NVM between comprises a programmed read return content to enable a secure boot routine from the OTP memory/NVM.

An eighteenth example includes the subject matter of the seventeenth example, further comprising: a read-ok register, coupled to a first path between the hardware logic component and a standard random-access memory (SRAM) register bus, configured to receive a write content based on the comparison from the hardware logic component; and a boot control register, coupled to a second path that is different from the first path between the hardware logic component and the SRAM register bus, configured to receive a secure boot indication from the OTP memory/NVM via the local read FSM.

A nineteenth example includes the subject matter any one or more of the seventeenth example to the eighteenth example, wherein the boot ROM processor is coupled to the SRAM register bus via a read master component configured to receive the write content from the read-ok register and the secure boot indication from the boot control register.

A twentieth example includes the subject matter of any one or more of the seventeenth example to the nineteenth example, wherein the boot ROM processor is further configured to enable the secure boot routine with the read return content based on the secure boot indication of the boot control register and the write content of the read-ok register.

A twenty-first example includes the subject matter of any one or more of the seventeenth example to the twentieth example, wherein the boot ROM processor is further configured to determine whether the read return content from the OTP memory/NVM comprises a set of falsely read zeros or a set of trusted zeros based on the comparison and a secure boot indication of a boot control register in the OTP memory/NVM.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A system of a boot read only memory (ROM) chip unit to perform a boot routine comprising:
    a processor device comprising the boot ROM chip unit including processing circuitry on a system board configured to perform a system board power up; and
    a one-time-programmable OTP memory/non-volatile memory (NVM), coupled to the processor device, comprising a spare area in a portion of the OTP/NVM, wherein the OTP memory/NVM is configured to receive a first sequence pattern;
    wherein the processor device is further configured to determine whether a secure boot indication indicates a secure boot routine, and differentiate one or more read return contents of an OTP memory/NVM read operation from the OTP memory/NVM between a wrongly read return content and a trusted read return content, in response to, or concurrent with, the secure boot indication indicating the secure boot routine,
    wherein the processor device is further configured to determine whether the first sequence pattern matches a second sequence pattern, re-boot the boot ROM chip unit in response to the first sequence pattern not matching the second sequence pattern, and enable OTP related operations, including the secure boot routine, based on the secure boot indication, in response to a match of the first sequence pattern in the spare area of the portion of the OTP memory/NVM to the second sequence pattern, wherein the second sequence pattern is located in a hardware logic component of a local read FSM coupled to an input terminal of the OTP memory/NVM.

2. The system of claim 1, wherein the OTP memory/NVM is configured to receive the first sequence pattern at the spare area of the portion of the OTP/NVM via a product tester component in response to a successful product test.

3. The system of claim 1, wherein the processor device comprising a hardware logic component configured to generate a comparison of the first sequence pattern in the spare area with a second sequence pattern at the hardware logic component, and perform a write into a read-ok register based-on the comparison.

4. The system of claim 1, wherein the processor device is further configured to generate a confirmation of whether a read return is correctly functioning based on a write in a read-ok register and the secure boot indication and to enable the secure boot routine based on the confirmation.

5. The system of claim 1, further comprising:
    a read-ok register, coupled along a first path between a hardware logic component and a standard random-access memory (SRAM) register bus, configured to receive a write based on a comparison of the first sequence pattern in the spare area with a second sequence pattern in the hardware logic component.

6. The system of claim 5, further comprising:
    a boot control register, coupled along a second path that is different from the first path between the hardware logic component and the SRAM register bus, configured to receive the secure boot indication.

7. The system of claim 1, further comprising: a local read finite state machine (FSM), coupled to the OTP memory/NVM and an SRAM register bus that is coupled to the boot ROM chip unit at a read master component, comprising a hardware logic component configured to generate a comparison, and configured to read the secure boot indication and update a boot control register with the secure boot indication.

* * * * *